Figure 1:
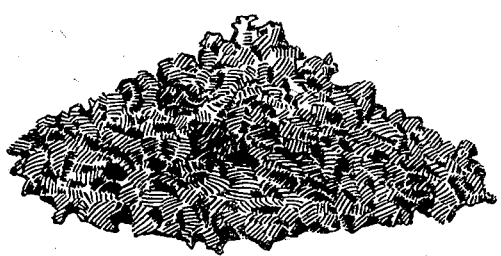

S. P. MORRISON.
PACKING.
APPLICATION FILED NOV. 21, 1907.

926,676.

Patented June 29, 1909.

WITNESSES:
W. M. Gentle.
N. Allemong.

INVENTOR.
Septimus P. Morrison.
BY
V. H. Lockwood
ATTORNEY

UNITED STATES PATENT OFFICE.

SEPTIMUS P. MORRISON, OF STUTTGART, ARKANSAS.

PACKING.

No. 926,676.     Specification of Letters Patent.     Patented June 29, 1909.

Application filed November 21, 1907. Serial No. 403,138.

*To all whom it may concern:*

Be it known that I, SEPTIMUS P. MORRISON, a citizen of the United States, residing at Stuttgart, in the county of Arkansas and State of Arkansas, have invented certain new and useful Improvements in Packings, of which the following is a specification.

This invention relates to packing for piston-rods, and in fact for use in any stuffing-box or the like, and more particularly to that class of packing comprising a body or vehicle carrying lubricant material, constituting what is styled "self-lubricating" packing. In packing of this kind heretofore and at present in use, the body or vehicle has been of various materials, and invariably the article has been open to serious objections. Where the body is made of a composition of canvas and rubber, or the like, the packing, when used in connection with piston-rods, infallibly carbonizes, chars, and cuts the rods. Where a hempen compound is used, carbonized crystals and acids are formed, which both cut and rust the rods. A fibrous body is objectionable, because it creates friction, and permits of the embedding within it of floating grit, etc., often present in steam and water, thus constantly wearing and scoring the rods. Where a "metallic packing" is used, made of coated shot, wires, or sticks, the amount of lubricant and degree of plasticity are insufficient to permit of complete packing, thus allowing a constant waste of power.

It is the object of this invention, therefore, to produce a packing which shall be free from all the positive objectionable features enumerated, and in which the negative objections set forth are replaced by positive advantages subserving the purposes of a packing much more completely than has heretofore been done.

With these and other objects in view, the present invention consists chiefly in the provision of a novel vehicle or packing-body proper, which possesses, in an unexampled degree, all the qualities of cells, whereby it is adapted as a lubricant carrier; plasticity, whereby the "pack" may be made as complete as practice may require; resistance to the wear and tear of hard service; neutrality, so far as the formation of chemical compounds, carbonized particles of the vehicle material, etc., injurious to the rods, are concerned; and in which the vehicle and the lubricating substances may be so thoroughly intermingled that they cannot become separated by heat, wear, or pressure. Such a vehicle is shown in the drawings, separately and in combination with the lubricant which it is adapted to carry.

Figure 2:
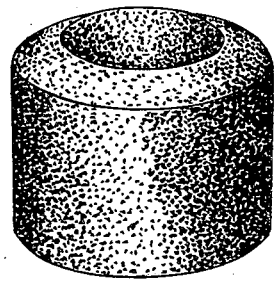
Figure 3:
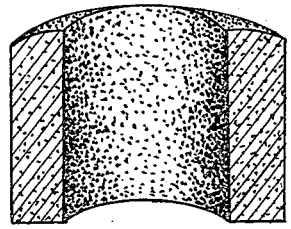
Figure 4:

In the drawings: Figure 1 is a view of a portion of granules of the packing material with contained lubricant, ready to be placed in a stuffing-box; Fig. 2 is a view showing the condition of the material shown in Fig. 1 after the same has been placed in a stuffing-box, and the gland tightened thereupon; Fig. 3 is a view of the valve-box pack shown in Fig. 2, sawed in half. Fig. 4 is a magnified section of part of one of the granules, without the lubricant, clearly disclosing the cellular structure which is the basis of this invention.

The packing-body comprises essentially a cellular structure, preferably of iron or other suitable metallic substance. Such substance is formed by a suitable process into granules having a loculate, compressible, and poriferous structure, as shown in Fig. 4. This structure is differentiated from merely porous or spongy packing-bodies, and from those which have simply interstitial spaces, like fibrous packings, and in fact from all packings now in use, because it is a unitary, poriferous, compressible body, and withal and especially, loculate, having clearly defined cells, much like those of a honey-comb. The cells of the granules being charged with suitable lubricant material, the granules are ready to be placed in a stuffing-box, whereupon, when the gland is tightened over them, by reason of their compressibility and ready coalescence, they are brought into the form of a homogeneous packing, as shown in Fig. 2.

The metal or substance of the packing-body is chosen with regard to its density and other attributes, which determine resistance to wear and other qualities that must be considered in the make-up of a practical packing.

When, as of course happens in time, the packing wears away somewhat, all that is necessary is to add a sufficient portion of fresh granules, and tighten the gland, whereupon there will be an amalgamation of the new and old material, and the packing is made complete as in the first instance. It is never necessary to replace a packing entirely. At most an occasional slight addition of fresh granules is required, to compensate for the loss inevitable in practice.

It is thought that the method of using this invention is sufficiently indicated in the foregoing description, so that further explanation need not be made to those skilled in the art.

It should be said that the present invention relates to the cellular and lubricant-bearing packing *per se*, as an article of manufacture; and the method of forming the structure, the lubricant material, and the method of placing the same in the structure, form no part thereof.

The metallic structure herein described is compressible because the walls thereof are relatively large and the walls of the cells are relatively thin and porous. When the packing is compressed the cells are to some extent reduced in dimensions and the walls thereof rendered more compact so that the pores will be more or less closed, and thus the lubricant be partially imprisoned in the cells until the cells are broken open by contact with a rod or the thing being lubricated, and this breaking open process takes place very slowly.

By the term "loculate" used herein, I mean furnished with cells, compartments or divisions substantially as in honey-combs, sponges, and the like, and having porous walls, whereby the cells will become charged with particles of graphite or other lubricant and the cellular structure still be maintained.

What I claim is:

As a new article of manufacture, a unitary loculate poriferous metallic structure, whose cells are charged with lubricant material, substantially as and for the purpose set forth.

In testimony whereof I affix my signature in presence of two witnesses.

SEPTIMUS P. MORRISON.

Witnesses:
 EDUARD FESER,
 L. J. BROWN.